United States Patent
Berghegger

(10) Patent No.: US 7,440,296 B2
(45) Date of Patent: *Oct. 21, 2008

(54) SWITCHED MODE POWER SUPPLY HAVING A CONTROL CIRCUIT FOR SETTING THE SWITCHING FREQUENCY OF THE PRIMARY SIDE SWITCH IN A LINEAR RELATIONSHIP TO A MEASUREMENT VOLTAGE PRODUCED FROM THE AUXILIARY VOLTAGE

(75) Inventor: Ralf Schroder genannt Berghegger, Glandorf (DE)

(73) Assignee: FRIWO Mobile Power GmbH, Ostbevern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/473,704

(22) Filed: Jun. 23, 2006

(65) Prior Publication Data
US 2007/0076447 A1    Apr. 5, 2007

(30) Foreign Application Priority Data
Jun. 24, 2005   (DE) ................. 10 2005 029 455

(51) Int. Cl.
*H02M 3/335* (2006.01)
(52) U.S. Cl. .................. 363/21.08; 363/21.16; 363/97
(58) Field of Classification Search .......... 363/21.08, 363/21.16, 97
See application file for complete search history.

(56) References Cited

U.S. PATENT DOCUMENTS

| 3,742,371 | A | * | 6/1973 | Seibt et al. | 363/18 |
| 4,858,052 | A | * | 8/1989 | McDonnal | 361/18 |
| 4,975,823 | A | * | 12/1990 | Rilly et al. | 363/21.16 |
| 5,438,499 | A | | 8/1995 | Bonte et al. | |
| 5,689,407 | A | * | 11/1997 | Marinus et al. | 363/21.15 |
| 5,936,852 | A | * | 8/1999 | Weinmeier et al. | 363/21.15 |
| 6,922,345 | B2 | * | 7/2005 | Nishida et al. | 363/21.16 |

(Continued)

FOREIGN PATENT DOCUMENTS

| DE | 2167212 C2 | | 9/1971 |
| DE | 19711771 | * | 10/1998 |
| DE | 10310361 | * | 9/2004 |
| GB | 1349870 | * | 4/1974 |
| JP | 2003324952 A | | 11/2003 |
| WO | 9509476 A1 | | 4/1995 |

*Primary Examiner*—Jeffrey L Sterrett
(74) *Attorney, Agent, or Firm*—Michael Best & Friedrich LLP

(57) ABSTRACT

This invention relates to a control circuit for the closed-loop control of an output voltage of a primary-controlled switched-mode power supply as well as an associated method. The switched-mode power supply comprises a primary-side switch and a transformer with at least one auxiliary winding in which an auxiliary voltage is induced after opening the primary-side switch. The voltage induced in the at least one auxiliary winding provides the basis for the measurement voltage passed to the control circuit and for the supply voltage of the control circuit. The invention also refers to an associated switched-mode power supply. In order to overcome the problems of known control circuits and to provide an improved control circuit for a primary-controlled switched-mode power supply, which can be constructed with increased control accuracy, but nevertheless with a small size and low component costs, the control circuit comprises a measurement voltage connection for connection to the measurement voltage and a supply voltage connection separate from same for connection to a supply voltage which is produced from the auxiliary voltage.

14 Claims, 5 Drawing Sheets

U.S. PATENT DOCUMENTS

| | | | |
|---|---|---|---|
| 7,035,122 B2 * | 4/2006 | Kim et al. | 363/21.18 |
| 7,061,780 B2 * | 6/2006 | Yang et al. | 363/21.16 |
| 7,102,899 B2 * | 9/2006 | Reinhard et al. | 363/21.01 |
| 7,295,450 B2 * | 11/2007 | genannt Berghegger | 363/21.08 |
| 2005/0276083 A1 * | 12/2005 | Berghegger | 363/95 |
| 2006/0208969 A1 * | 9/2006 | Berghegger | 345/60 |

* cited by examiner

SWITCHED MODE POWER SUPPLY HAVING A CONTROL CIRCUIT FOR SETTING THE SWITCHING FREQUENCY OF THE PRIMARY SIDE SWITCH IN A LINEAR RELATIONSHIP TO A MEASUREMENT VOLTAGE PRODUCED FROM THE AUXILIARY VOLTAGE

BACKGROUND OF THE INVENTION

1. Field of the Invention

The present invention relates to a control circuit for controlling an output voltage of a primary-controlled switched-mode power supply as well as to an associated method. The switched-mode power supply comprises a primary-side switch and a transformer with at least one auxiliary winding in which an auxiliary voltage is induced after opening the primary-side switch. The voltage induced in the at least one auxiliary winding provides the basis for the measurement voltage passed to the control circuit and for the supply voltage of the control circuit. The invention also relates to an associated switched-mode power supply.

2. Description of the Related Art

Normally, known switched-mode power supplies use a power transistor, for example an Insulated-Gate Bipolar Transistor (IGBT), as the primary-side switch to feed a pulsed current to a network of inductive and capacitive energy storage elements, which convert the switched current pulses into a controlled direct voltage. Switched-mode power supplies can supply output voltages which are greater, the same or of the opposite polarity to the uncontrolled input voltage, depending on the operating mode of the switched-mode power supply. Often switched-mode power supplies are used in power supply circuits, such as are required for example for a large number of electronic devices. Here, in particular in the case of mobile electronic devices, it is desirable that this type of switched-mode power supply accepts input voltages in the range of alternating voltage from 85 V to 270 V and therefore can be operated with different mains supplies anywhere in the world without modification or switches.

The output voltage of a switched-mode power supply is controlled by a feedback signal which replicates the output voltage. This feedback signal is used to control the working cycle of the switching power transistor. In order to provide a suitable feedback signal, various approaches exist; for example a primary-side auxiliary winding can be provided which, during the turn-off time of the primary-side transistor, generates a feedback signal which supplies a replica of the output voltage.

These types of switched-mode power supplies with auxiliary windings are for example shown in the German patent application DE 103 10 361, the European patent application EP 03 016 065.9, the U.S. Pat. No. 5,438,499 or the German published patent application DE 197 11 771 A1. In these cases, the signal generated in the auxiliary winding is passed to a feedback circuit which supplies the control signal to the control circuit. With a switched-mode power supply according to the flyback converter principle, with which the transferred energy per pulse remains constant and the duration of the spaces between the pulses is adjustable, as shown in EP 03 016 065.9, the output voltage can be very well replicated and controlled with the primary auxiliary voltage.

There is, however, the problem that the output current can only be acquired in a very complicated manner. For example, as shown in DE 103 10 361, the period of current flow in the secondary winding of the converter can be determined. Alternatively, an optocoupler can also be used as is shown, for example, in the European patent application EP 1 146 630 A2.

In order to be able to adjust the output voltage and the output current in a simple manner and to minimise the component costs necessary for this, a method of controlling the output voltage of a primary-controlled switched-mode power supply is proposed in which the switching frequency is adjusted in a linear relationship to the auxiliary voltage in that the switching frequency of the primary-side switch is determined by the charging time of a charging capacitor. This method is described in detail in the German patent application DE 10 2004 016927.6.

The switching arrangement of the control circuit from DE 10 2004 016927.6 is illustrated in FIG. 5. With the control circuit according to FIG. 5, the auxiliary voltage is measured on the supply voltage pin $V_p$ of an application-specific integrated circuit (ASIC) 200. Therefore in a disadvantageous manner, the voltage level can only be set by changing a series resistance when generating the ASIC operating voltage. However, since this has a large influence on the trace of the output characteristic, trimming of the output voltage is only possible with restrictions. Furthermore, the circuit according to FIG. 5 has the disadvantage that the supply current of the ASIC 200 and the base current of the switching transistor 104 affect the voltage control, because they load the operating voltage of the ASIC 200, which is also the measurement voltage.

Moreover, as explained in detail in DE 10 2004 016927.6, the charging current of the capacitor $C_t$, which determines the time, is switched off as long as the measurement voltage lies above the reference value $V\,C_{t1}$. Therefore, with low load a long turn-off time must arise. However, since the discharge current of the operating voltage capacitor C2 is approximately constant, the reference voltage must be initially clearly exceeded to produce a sufficiently long discharge period. In contrast with a large load the turn-off time is short and the excess above the reference voltage is therefore only slight. Since the initial measurement voltage corresponds to the output voltage, the output voltage deviates corresponding to the excess from the set-point value and consequently is higher on open circuit than under load.

Furthermore, the solution proposed here has the disadvantage that the operating voltage cannot be rated such that the set output current also flows in the case of a short circuit; this is because during a short circuit the measurement voltage only reflects the voltage on the secondary diode and there is therefore insufficient voltage for the ASIC to operate correctly.

Finally, with the arrangement illustrated in FIG. 5 negative influences of the rectifying diode on the accuracy of control occur in the current control.

Overall, there are then three significant problems with a switched-mode power supply according to the arrangement of FIG. 5: On open circuit the output voltage is higher than under load; with a low input voltage the output current is lower than at nominal voltage; the output voltage cannot be trimmed without the characteristic trace changing.

The control circuit presented in DE 103 10 361 B4 offers improved control accuracy compared to DE 10 2004 016927.6. This circuit is however comparatively complicated and needs an eight-pin case which substantially increases the costs.

SUMMARY OF THE INVENTION

Therefore, the object of the invention is to overcome the problems of the known control circuits and to provide an improved control circuit for a primary-controlled switched-mode power supply which can be constructed with increased control accuracy, but with a smaller size and less component costs.

To achieve this, the invention uses firstly the principle proposed in DE 10 2004 016927.6 to set the switching frequency of the primary-side switch in dependence of the auxiliary voltage induced on the auxiliary winding such that the output voltage and the output current of the switched-mode power supply assume values according to a predetermined output characteristic. Here, the term "output characteristic" is taken to mean the relationship between the output voltage and the output current in the form of a curve $U_{OUT}(I_{OUT})$.

Thus the situation can be avoided that expensive, component-intensive measurement techniques have to be provided for the determination of the output current. In doing this, the switching frequency is adjusted in a linear relationship to the auxiliary voltage in that the switching frequency of the primary-side switch is determined by the charging time of the charging capacitor. The charging capacitor is charged to a predetermined voltage threshold by a current proportional to the auxiliary voltage and determines the time at which the switch is switched on.

The invention is based on the idea that the charging duration of the timing capacitor in the voltage regulator is no longer extended due to the charging current switching off, but instead the charging current is allowed to flow continuously and the capacitor is short-circuited to extend the charging time. This enables the charging resistance to be directly connected to the supply voltage and the pin $R_t$, to which the charging resistance $R_T$ in the control circuit shown in FIG. 5 is connected, is now free and can be used according to the invention to realise the voltage acquisition.

An essential advantage of the solution according to the invention is that a voltage independent of the operating or supply voltage can be used as the measurement voltage and that therefore the influence of the load of the operating voltage on the output characteristic is minimised. The voltage control is therefore significantly more accurate.

According to an advantageous embodiment, the switching frequency is set in a linear relationship to the measurement voltage in that the charging time of a charging capacitor determines the switching frequency of the primary-side switch and the charging capacitor can be charged in dependence of the measurement voltage. This solution offers the advantage of a particularly simple realisation in terms of switching technology with a very low component requirement.

In order to define the time at which the primary-side switch can be switched on, the control circuit can be formed in an advantageous manner such that it short-circuits the charging capacitor when the measurement voltage reaches a predetermined threshold value. In this way the circuit complexity can be significantly reduced.

If the control circuit is formed such that it compares the voltage dropped across the charging capacitor with a reference value and produces a turn-on signal for switching on the primary-side switch when the voltage dropped across the charging capacitor reaches the reference value, a predetermined output characteristic of the switched-mode power supply can be achieved in a particularly simple manner.

In this case the switching frequency in the current control should ideally be directly proportional to the sum of the output voltage $U_{OUT}$ and the voltage drop on a secondary diode. Since however the output voltage is to be acquired indirectly via the auxiliary winding of the transformer, this rectifier diode leads to a deviation from the ideal value, because it subtracts an offset from the measurement voltage to be evaluated. Furthermore, the charging current of the timing capacitor is not proportional to the measurement voltage, because the voltage on the capacitor lies in series with the charging resistance. It would be quite possible to reduce this deviation in that the reference value for turning on the switching capacitor is reduced. However, this would have the disadvantage that the detection is less accurate, because the offset on an input comparator would have a stronger effect. Furthermore, a larger capacitor would be needed for the same time. Finally, a deviation also arises due to a discharge period of the timing capacitor.

Therefore, according to the invention the reference value can be set in relation to the measurement voltage. Thus, a voltage, which is dependent on the measurement voltage, can be superimposed on the reference voltage, which represents the threshold voltage for turning on the switching transistor. Due to this type of adjustable reference voltage the deviations described above can be compensated so that an output current which is almost independent of the output voltage is produced. Ideally, the new reference voltage thus arising for the turn-on of the switching transistor should have a trace such that the influence of the secondary-side rectifier diode on the measurement voltage is compensated. As an approximation, such a voltage trace can be produced with the aid of some Zener diodes and resistors, so that the corresponding circuit can be completely integrated into an ASIC.

According to an advantageous further development of the control circuit, a sample-and-hold (S&H) can be provided for the acquisition of a measurement voltage deviation from the reference value directly after the turn-off of the primary-side switch. In this way it is possible to prevent the output voltage of the switched-mode power supply rising higher on open circuit than under load. According to the invention, the level of the deviation of the measurement voltage from the reference value is stored shortly after the switching transistor turns off. The stored value is added to the measurement voltage and the switching transistor is only switched on again when the sum of the stored value and the measurement voltage falls below the reference voltage. Alternatively, it is also possible to subtract the stored value from the reference voltage. In this way exceeding the reference voltage is compensated and the output voltage becomes independent of the load.

The advantageous properties of the control circuit according to the invention become apparent above all in a primary-controlled switched-mode power supply.

According to an advantageous embodiment the transformer of the switched-mode power supply comprises a first auxiliary winding for the generation of the measurement voltage and a second auxiliary winding for generating the supply voltage. In this way complete isolation of the measurement voltage from the operating voltage can be realised and the control accuracy is significantly improved.

In order to trim the output voltage, the measurement voltage connection can be connected to a voltage divider which trims the measurement voltage and thus the output voltage in an especially simple manner.

Since with the solution according to the invention the voltage acquisition occurs independently of the operating voltage of the control circuit, the operating voltage can be rated such that the set output current also flows with a short circuit.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
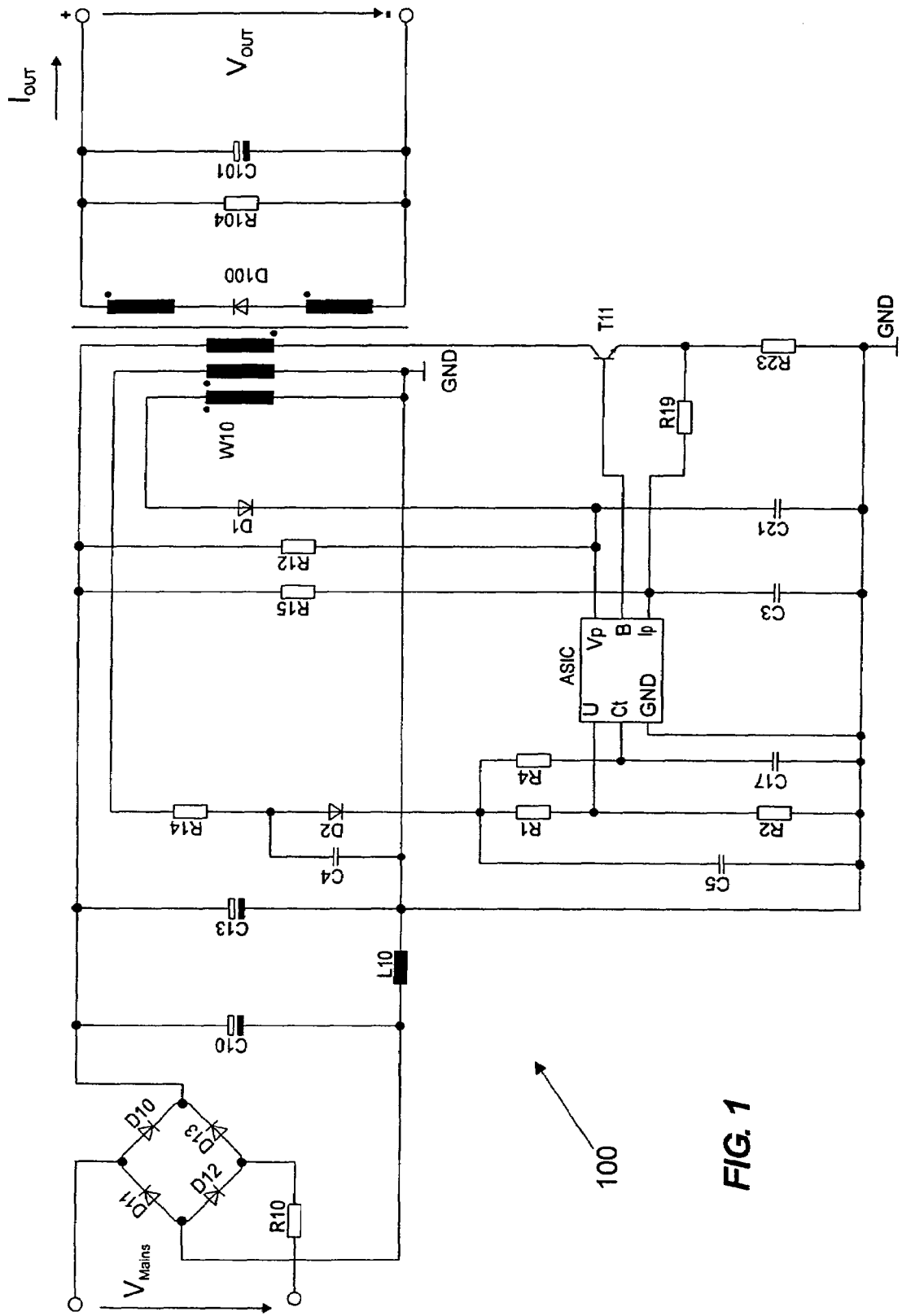
FIG. 1 shows a block diagram of a control circuit according to the invention in a switched-mode power supply according to a possible embodiment.

Referring now to the drawings and in particular to FIG. 1 a wiring diagram of a primary controlled switched-mode power supply with a control circuit according to the invention is shown. Basically, in this arrangement the principles according to the German patent application DE 10 2004 016927.6 are realised.

In particular the output voltage $V_{OUT}$ and the output current $I_{OUT}$ can be controlled such that they exhibit a trace according to a predetermined output characteristic. According to this embodiment this is a linear relationship.

The alternating voltage $V_{MAINS}$ is applied to the input of the switched-mode power supply. In Europe the mains voltage varies between 180 V and 263 V alternating voltage and in America between 90 V and 130 V alternating voltage. The input voltage $V_{MAINS}$ is rectified and stabilised with the aid of the bridge rectifiers D10 to D13 and the capacitors C10 and C13 together with the inductance L10 and it is ensured that interference signals, which are produced in the switched-mode power supply, do not enter the alternating voltage network.

The primary-side winding 110 of the transformer W10 and the primary-side switch T11, which here is a power transistor, form a series circuit which is connected to the rectified input voltage. The primary-side switch T11 interrupts the current, which flows through the primary-side winding 110, according to the control signal B from the control circuit 102.

According to the invention the turn-off period of the primary-side switch T11 is set such that the energy stored in the transformer W10 is dependent on the output voltage $V_{OUT}$. The transferred power is thus set such that a desired value for the output voltage $V_{OUT}$ arises. According to the invention, here the value for the voltage $U_{OUT}$ is adapted such that a constant and predetermined value for the output current $I_{OUT}$ arises. In contrast to the solution proposed in DE 10 2004 016927.6, the control circuit, which is here realised as a user-specific integrated circuit (ASIC), comprises two separate inputs U and $V_p$ for the measurement voltage and the supply voltage.

A measurement voltage V(U), which is produced in a first auxiliary winding 116, is applied to the measurement voltage connection U. A supply voltage $V(V_p)$, which is obtained with the aid of a second auxiliary winding 114, is applied separately to the supply voltage connection $V_p$. The separation according to the invention of the two inputs U and $V_p$ could also be realised based on a single auxiliary winding. The embodiment shown here however offers the advantage of a complete independence of the two branches with respect to one another. In particular the numbers of turns of the two auxiliary windings 114, 116 can be chosen corresponding to the respective requirements.

In order to render the voltage level on the measurement voltage connection U (and therefore effectively the output voltage $V_{OUT}$) trimmable, a voltage divider R1, R2 is provided.

The capacitor C17 is connected to the connection $C_t$ of the ASIC 102 such that the voltage dropped across it determines the time up to the turn-on of the primary-side switch T11. The operating voltage (or also the supply voltage) $V(V_p)$ of the ASIC 102 is fed to the connection $V_p$.

The input IP of the ASIC 102 according to the invention is used for measuring the current which flows through the primary-side winding 110 of the transformer W10 when the primary-side switch T11 is closed. This can occur in a known manner similar to that proposed in DE 10 2004 016927.6. The sixth connection of the ASIC according to the invention is a ground connection, GND, and is connected to the chassis ground.

According to the invention the charging period of the timing capacitor C17 in the voltage regulator is extended by a short circuit.

Figure 2:
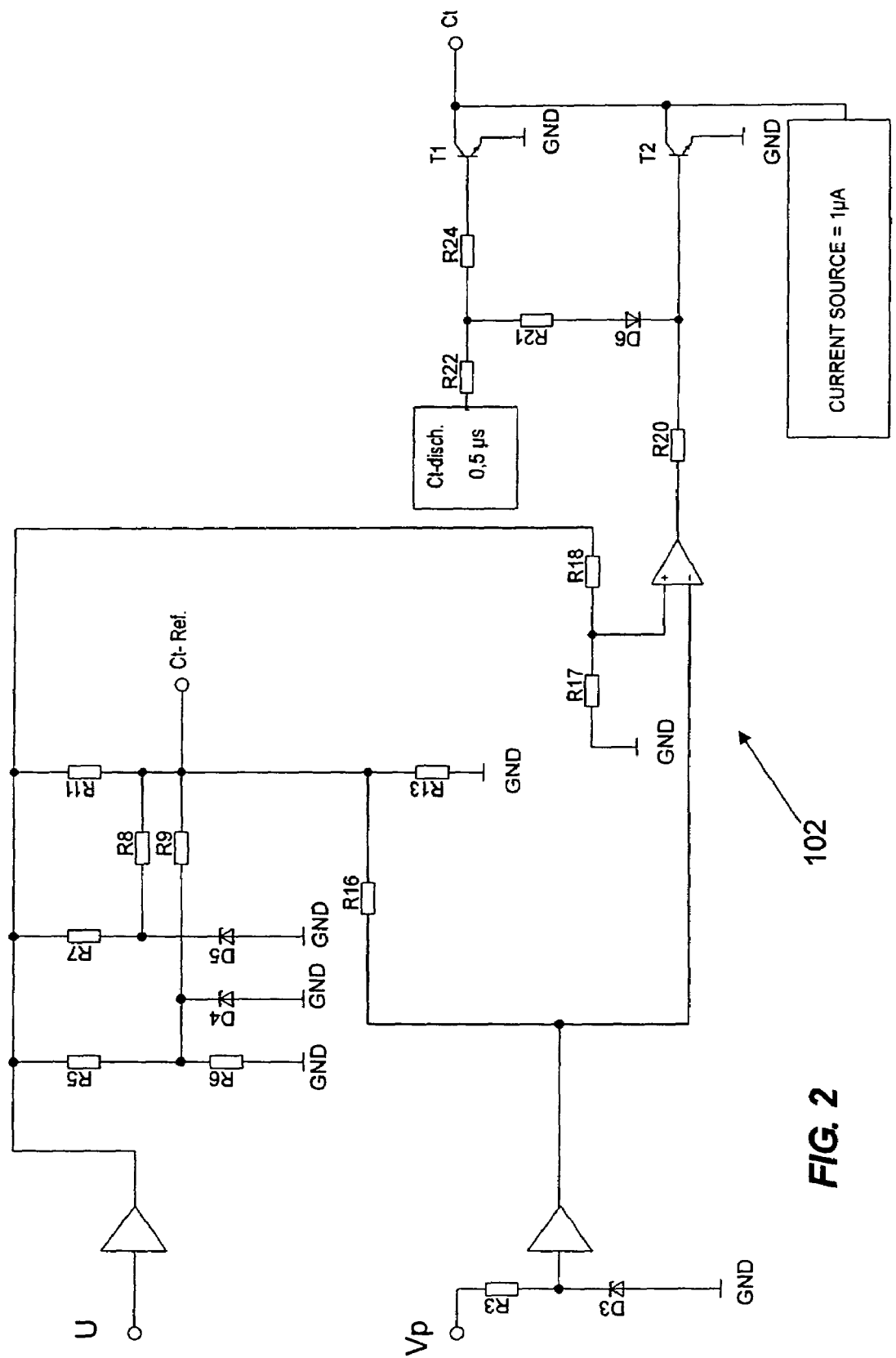
FIG. 2 shows an extract of the internal circuit of the control circuit according to a first embodiment.

The construction and functioning principle of the control circuit 102 according to the invention is considered in more detail with reference to FIG. 2. Here, FIG. 2 only illustrates an extract from this control circuit according to a first advantageous embodiment. Only the external connections U, $V_p$ and $C_t$ are illustrated; the remaining parts of the control circuit are not essentially relevant to the invention and can therefore be realised in a known manner.

The measurement voltage V(U) is fed to the connection U. The charging capacitor C17 is connected, as shown in FIG. 1, to the connection $C_T$. According to the invention the charging current flows into the charging capacitor C17 continuously and the charging capacitor C17 is short-circuited via the connection $C_T$ in order to extend the charging duration of the timing capacitor.

In this embodiment the discharge time of the timing capacitor is fixed at 0.5 μs. A reference voltage V(Ct-Ref) can be fed internally to the connection Ct-Ref in order to charge or short-circuit the capacitor C17 from a comparison with the measurement voltage V(U) applied to the connection U.

According to an advantageous further development of the invention V(Ct-Ref) is not a fixed value, but rather is itself in turn dependent on the measurement voltage V(U). In principle ideally the switching frequency should be directly proportional to the output voltage $V_{OUT}$ and to the voltage drop across the secondary diode D100 in FIG. 1. If however, as is the case according to the invention, the output voltage $V_{OUT}$ is to be acquired via the auxiliary winding 116 of the transformer W10, the rectifier diode D100 leads to a deviation from the ideal value, because it subtracts an offset from the measurement voltage. Furthermore, as already mentioned, the charging current of the timing capacitor C17 is not proportional to the measurement voltage V(U), because the voltage on the capacitor C17 lies in series with the charging resistance R4. This deviation could be reduced if the threshold voltage V(Ct-Ref) for turning on the switching transistor T11 is reduced. However, this has the disadvantage that the detection is less accurate, because the offset of the input comparator has a stronger effect. Furthermore, for the same time period a larger capacitor C17 is needed and a deviation due to the discharge period of the timing capacitor C17 arises.

Figure 4:
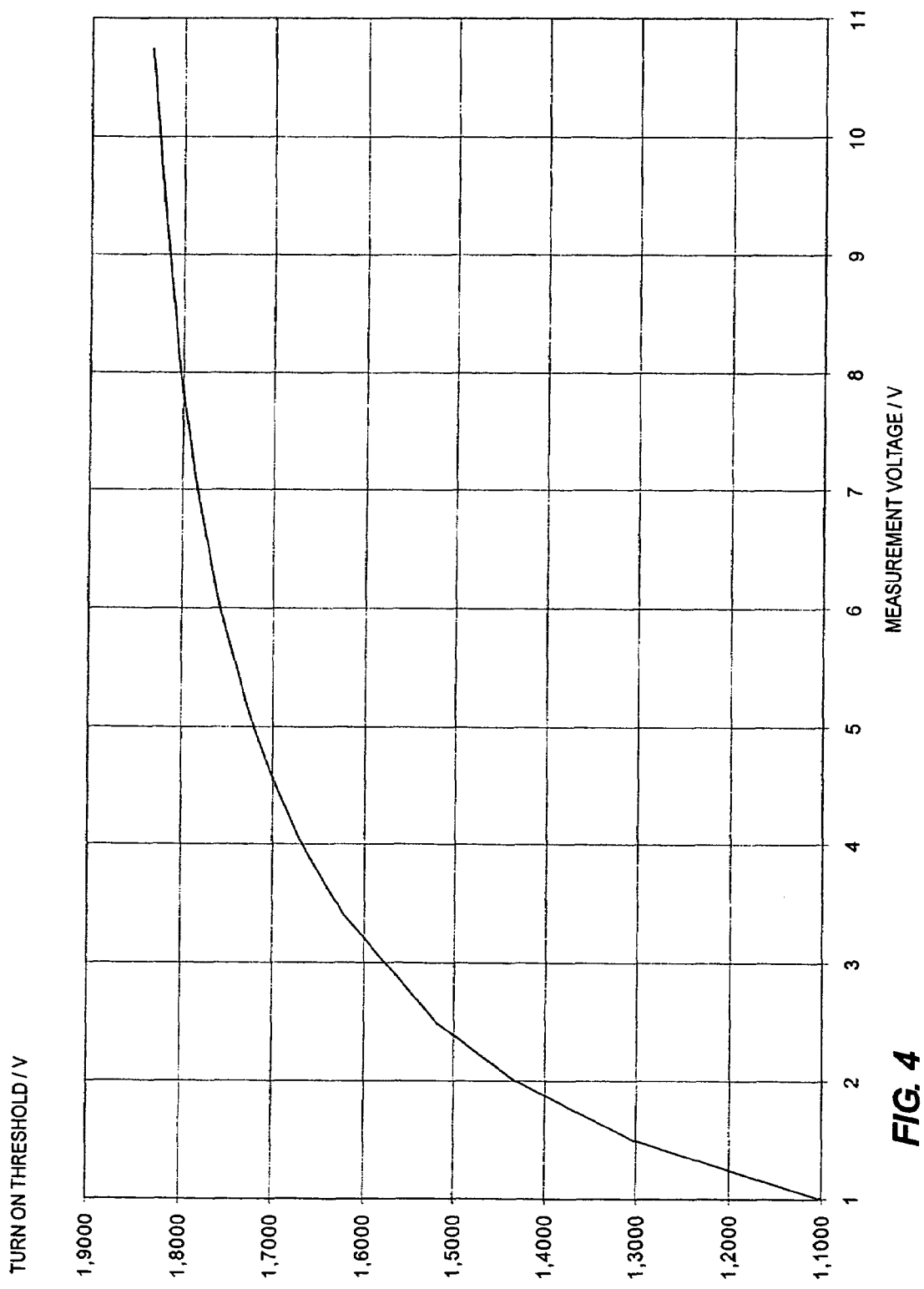
FIG. 4 shows an example of a reference voltage, dependent on a measurement voltage, for turning on the switching transistor.
Figure 5:
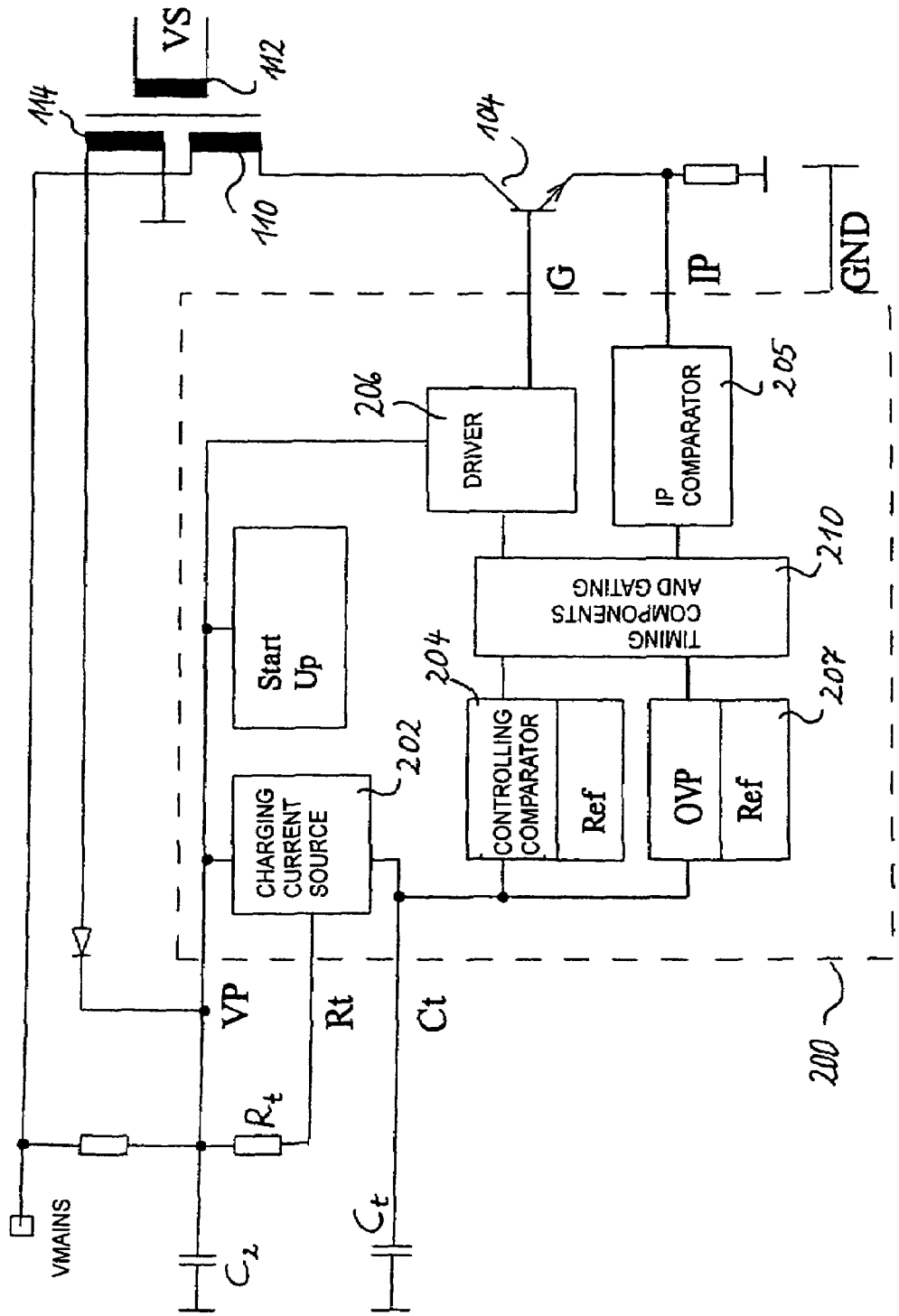
FIG. 5 shows a block diagram of a known control circuit in its application environment.

Therefore, a voltage, which in turn is dependent on the measurement voltage V(U), can be superimposed on the threshold voltage for turning on the switching transistor. FIG. 4 illustrates a possible curve of the voltage V(Ct-Ref) in relationship to the measurement voltage V(U), in volts in each case. The trace illustrated here applies to a voltage drop on the diode D2 in the measurement circuit of 0.5 V, a maximum switching frequency of approx. 40 kHz and a discharge period for the capacitor C17 of 0.5 µs. The voltage trace illustrated in FIG. 4 can be approximately produced with the aid of some Zener diodes and resistances and can therefore be completely integrated into the ASIC. The deviations described above are compensated by this type of reference voltage V(Ct-Ref) so that an output current $I_{OUT}$, almost independent of the output voltage, arises due to the switched-mode power supply according to the invention.

Figure 3:
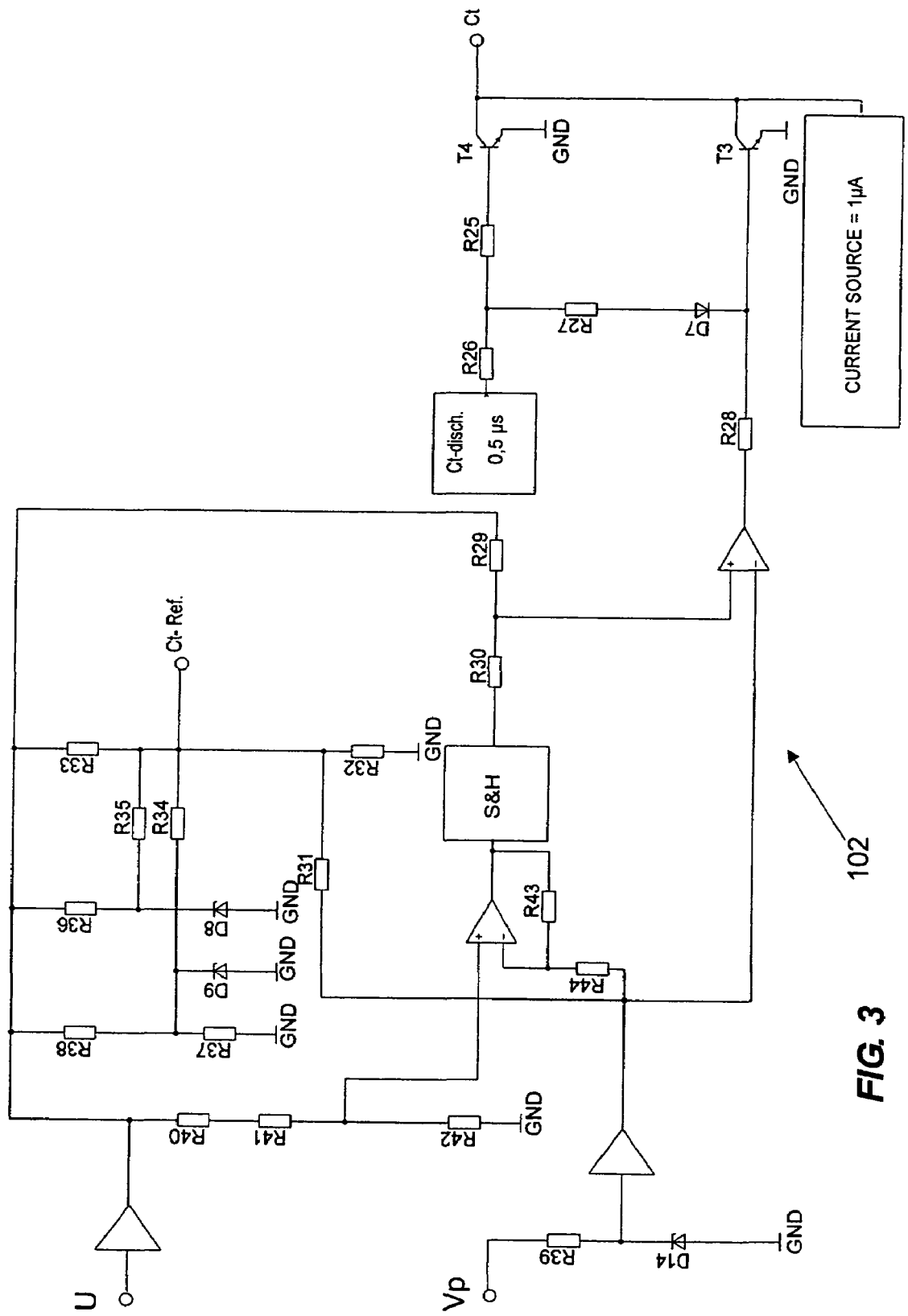
FIG. 3 shows an extract of the internal circuit of the control circuit according to a second embodiment.

A further embodiment of the control circuit according to the invention is illustrated in FIG. 3. Also here, only extracts of the complete control circuit are illustrated in order to maintain clarity. An essential difference of this circuit to the embodiment illustrated in FIG. 2 is that a sample-and-hold 118 is provided to acquire and store a deviation of the measurement voltage V(U) from the reference value shortly after the switching transistor T11 turns off. In the illustrated circuit the stored value is added to the measurement voltage V(U) and the switching transistor T11 is only switched on again when the sum of the stored value and the measurement voltage V(U) falls below the reference voltage V(Ct-Ref). Alternatively, the value stored in the sample-and-hold 118, could of course also be subtracted from the reference voltage V(Ct-Ref). In this way, as with the solution from DE 10 2004 016927.6, the effect of the reference voltage being exceeded can be compensated and thus the output voltage $V_{OUT}$ becomes independent of the load.

Both in the embodiment of FIG. 2 and in the embodiment of FIG. 3 a current source 120 is provided which supplies a current at the level of, for example, 1 µA, and is turned off when the measurement voltage V(U) exceeds a certain value (for example 1.5 V) in order to establish stable initial conditions.

Since with the control circuit according to the invention the voltage acquisition occurs independently of the operating voltage of the circuit, the operating voltage can be rated such that the set output current $I_{OUT}$ also still flows even with a short circuit. Thus, many problems of known solutions can be overcome with the control circuit according to the invention and nevertheless a cost-effective and substantially miniaturised arrangement can be achieved. In particular a realisation as an ASIC in an inexpensive six-pin case (e.g. SOT23-6) is possible.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. Control circuit for controlling the output voltage of a primary-controlled switched-mode power supply, wherein the switched-mode power supply comprises a primary-side switch and a transformer with at least one auxiliary winding, in which an auxiliary voltage is induced after opening the primary-side switch,
    wherein the control circuit is adapted to set the switching frequency of the primary-side switch in a linear relationship to a measurement voltage produced from the auxiliary voltage, wherein a constant factor of this linear relationship is selected such that the output current of the switched-mode power supply assumes a predetermined value,
    wherein the control circuit comprises a measurement voltage terminal for connection to the measurement voltage and a supply voltage terminal, separate from same, for connecting to a supply voltage which is produced from the auxiliary voltage,and
    wherein the control circuit is formed such that it compares the voltage dropped across a charging capacitor with a reference value and produces a turn-on signal for switching on the primary-side switch when the voltage dropped across the charging capacitor reaches the reference value that can be set in relationship to the measurement voltage.

2. Control circuit according to claim 1, which comprises an input terminal, which can be connected to a charging capacitor, wherein the charging capacitor can be charged in relationship to the measurement voltage and is connected to the primary-side switch such that the voltage dropped across the charging capacitor controls the switching frequency of the primary-side switch.

3. Control circuit according to claim 2, which is formed such that it short-circuits the charging capacitor when the measurement voltage reaches a predetermined threshold value.

4. Control circuit according to claim 1, wherein the relationship of the reference value to the measurement voltage is selected such that the influence of a secondary-side rectifier diode on the measurement voltage is compensated.

5. Control circuit according to claim 1, which comprises a sample-and-hold for the acquisition of a deviation of the measurement voltage from the reference value directly after the primary-side switch turns off.

6. Switched-mode power supply with a control circuit for controlling the output voltage of a primary-controlled switched-mode power supply, wherein the switched-mode power supply comprises a primary-side switch and a transformer with at least one auxiliary winding, in which an auxiliary voltage is induced after opening the primary-side switch,
    wherein the control circuit is adapted to set the switching frequency of the primary-side switch in a linear relationship to a measurement voltage produced from the auxiliary voltage, wherein a constant factor of this linear relationship is selected such that the output current of the switched-mode power supply assumes a predetermined value, and
    wherein the control circuit comprises a measurement voltage terminal for connection to the measurement voltage and a supply voltage terminal, separate from same, for connecting to a supply voltage which is produced from the auxiliary voltage.

7. Switched-mode power supply according to claim 6, wherein the transformer comprises a first auxiliary winding for producing a measurement voltage and a second auxiliary winding for producing the supply voltage.

8. Switched-mode power supply according to claim 6, wherein furthermore a voltage divider is connected to the measurement voltage connection for trimming the voltage level on the output voltage of the switched-mode power supply.

9. Method of controlling the output voltage of a primary-controlled switched-mode power supply using a control circuit, wherein the switched-mode power supply comprises a primary-side switch and a transformer with at least one auxiliary winding in which, after opening the primary-side switch, an auxiliary voltage is induced for producing a measurement voltage which forms the output voltage, and for producing a supply voltage for the control circuit, wherein the switching frequency of the primary-side switch is adjusted in relationship to the auxiliary voltage such that the output voltage and the output current of the switched-mode power supply assume values according to a predetermined output characteristic, wherein the measurement voltage and the supply voltage are passed to the control circuit via connections which are separate from one another, and whereby the primary-side switch is switched on when the voltage dropped across the charging capacitor reaches a predetermined reference value, and wherein, after the primary-side switch turns off, a deviation of the measurement voltage from the reference value is stored and the stored value is used to produce a new reference value.

10. Method according to claim 9, wherein the stored value is added to the measurement voltage and the primary switch is turned on when the sum of the measurement voltage and the stored value is below the reference value.

11. Method according to one of the claims 9, wherein the measurement voltage and the supply voltage are formed based on a first and a second auxiliary voltage, which are each produced in separate primary-side auxiliary windings.

12. Method according to claim 9, wherein the switching frequency of the primary-side switch is adjusted at least for some values of the auxiliary voltage in a linear relationship to the auxiliary voltage, wherein a constant factor of this linear relationship is selected such that the output current assumes a predetermined constant value.

13. Method according to claim 12, wherein the charging time of a charging capacitor, which can be charged in relationship to the auxiliary voltage, determines the switching frequency of the primary-side switch.

14. Method according to claim 13, wherein the charging capacitor is charged by a continuous charging current and is short-circuited to extend the charging time.

* * * * *